US009084225B2

(12) United States Patent
Baek et al.

(10) Patent No.: US 9,084,225 B2
(45) Date of Patent: Jul. 14, 2015

(54) BIDIRECTIONAL FLOW SERVICE SUPPORT METHOD IN IEEE 802.16/WIBRO SYSTEM

(75) Inventors: Joo-Young Baek, Pohang (KR); Min-Kon Kwak, Seongnam (KR); Dong-Hee Kwon, Seongnam (KR); Young Joo Suh, Pohang (KR)

(73) Assignees: POSTECH ACADEMY-INDUSTRY FOUNDATION, Pohang (KR); POSTDATA CO., LTD, Seongnam (KR); POSCO RESEARCH ASSOCIATION, Pohang (KR); POSCO, Pohang (KR)

( * ) Notice: Subject to any disclaimer, the term of this patent is extended or adjusted under 35 U.S.C. 154(b) by 1102 days.

(21) Appl. No.: 12/200,399

(22) Filed: Aug. 28, 2008

(65) Prior Publication Data
US 2009/0063692 A1 Mar. 5, 2009

(30) Foreign Application Priority Data
Aug. 29, 2007 (KR) .................. 10-2007-0087276

(51) Int. Cl.
| G06F 15/16 | (2006.01) |
| H04W 76/02 | (2009.01) |
| H04L 12/801 | (2013.01) |
| H04W 72/12 | (2009.01) |
| H04L 12/917 | (2013.01) |

(Continued)

(52) U.S. Cl.
CPC .............. *H04W 76/02* (2013.01); *H04L 47/10* (2013.01); *H04L 47/76* (2013.01); *H04L 47/824* (2013.01); *H04W 72/1268* (2013.01); *H04L 12/5695* (2013.01); *H04W 28/16* (2013.01); *H04W 72/00* (2013.01)

(58) Field of Classification Search
CPC ..... H04L 47/10; H04L 47/824; H04W 72/00; H04W 28/02; H04W 72/0413; H04W 72/042; H04W 28/00; H04W 76/02
USPC .................................... 709/230; 455/435–550
See application file for complete search history.

(56) References Cited

U.S. PATENT DOCUMENTS

| 2004/0185853 A1* | 9/2004 | Kim et al. ..................... 455/438 |
| 2005/0215279 A1* | 9/2005 | Shim et al. ................. 455/550.1 |

(Continued)

FOREIGN PATENT DOCUMENTS

EP 1655982 A2 5/2006

OTHER PUBLICATIONS

"Part 16: Air Interface for Fixed Broadband Wireless Access Systems," IEEE STD 802.16-2004, IEEE, New York, NY, US, Jun. 1, 2004.

(Continued)

Primary Examiner — Yves Dalencourt
(74) Attorney, Agent, or Firm — Perman & Green, LLP

(57) ABSTRACT

Provided is a bidirectional service flow management method in a wideband wireless connection communication system, and more particularly, a method of performing a bidirectional flow establishment. The method of providing a flow service in an IEEE 802.16/WiBro includes: generating a revised dynamic service addition (DSA) related message in which an area for designating bidirectional flow management information is allocated from a standard DSA related message; and performing a bidirectional flow initialization process between a subscriber station (SS) and a base station (BS) via single control message negotiation based on the revised DSA related message.

11 Claims, 6 Drawing Sheets

(51) Int. Cl.
*H04L 12/911* (2013.01)
*H04L 12/54* (2013.01)
*H04W 28/16* (2009.01)
*H04W 72/00* (2009.01)

(56) References Cited

U.S. PATENT DOCUMENTS

2006/0039313 A1    2/2006  Chou et al.
2006/0121898 A1*   6/2006  Kim et al. .................. 455/435.1
2006/0160533 A1*   7/2006  Chou et al. ................ 455/422.1

OTHER PUBLICATIONS

Jianfeng, Chen et al., "A service flow management strategy for IEEE 802.16 broadband wireless access systems in TDD mode," Communications, 2005. ICC 2005. 2005 IEEE International Conference on Seoul, Korea, May 16-20, 2005, Piscataway, NJ, USA, vol. 5, May 16, 2005, pp. 3422-3426.

Choi, W. et al., " Designing a Novel Unlicensed Nomadic Access Relay Station in IEEE 802.16-Based Wireless Access Networks," Vehicular Technology Conference, 2007. VTC 2007, IEEE, PI, Apr. 1, 2007, pp. 2961-2965.

European Office Action dated Jan. 28, 2011.

* cited by examiner

BIDIRECTIONAL FLOW SERVICE SUPPORT METHOD IN IEEE 802.16/WIBRO SYSTEM

CROSS-REFERENCE TO RELATED PATENT APPLICATION

This application claims the benefit of Korean Patent Application No. 10-2007-0087276, filed on Aug. 29, 2007, in the Korean Intellectual Property Office, the disclosure of which is incorporated herein in its entirety by reference.

BACKGROUND OF THE INVENTION

1. Field of the Invention

The present invention relates to a bidirectional service flow management method in a wideband wireless connection communication system, and more particularly, to a method of establishing a bi-directional flow.

2. Description of the Related Art

Technology of the 802.16 system has been standardized by the IEEE/TTA working group, and has been commercialized in Korea as wireless broadband (WiBro). Therefore, although technologies of general items are classified and expressed by the IEEE/TTA working group, each detailed technology has not been finally determined.

With regard to a technology for managing a data flow that can be classified as an admission control procedure, since the 802.16 system is a connection-based system, the 802.16 system can receive a flow service between a base station (BS) and a subscriber station (SS) after the BS and SS communicate information on a flow and the BS admits the flow service to be provided to the 802.16 system via a dynamic service addition (DSA) related message.

However, the flow admission control mechanism is not described in detail except for the communication and processing of the DSA message. Furthermore, since a study relating to the admission control in the 802.16/WiBro system is currently at an initial stage, and an algorithm used in the conventional $3^{rd}$ generation communication technology is applied to perform the admission control, it is difficult to reflect intrinsic characteristics of the 802.16/WiBro system.

The conventional 802.16/WiBro system performs a different flow initiation process with regard to an uplink and a downlink, which causes a waste of resources and a waste of time when communicating a control message.

SUMMARY OF THE INVENTION

The present invention provides a bidirectional flow service support method in an IEEE 802.16/WiBro system capable of supporting a bidirectional flow service via a single flow initiation process.

The present invention also provides a computer readable recording medium storing a program for executing the bidirectional flow service support method in an IEEE 802.16/WiBro system via a single flow initiation process.

According to an aspect of the present invention, there is provided a method of providing a flow service in an IEEE 802.16/WiBro, the method comprising: generating a revised dynamic service addition (DSA) related message in which an area for designating bidirectional flow management information is allocated from a standard DSA related message; and performing a bidirectional flow initialization process between a subscriber station (SS) and a base station (BS) via single control message negotiation based on the revised DSA related message.

The revised DSA related message may further allocate an information area for designating whether uplink and downlink sessions are established, modified, or deleted in an application specification type field of the standard DSA related message.

The revised DSA related message may further allocate an information area for designating that uplink and downlink sessions have identical session characteristics in the application specification type field of the standard DSA related message.

The revised DSA related message may further allocate an information area for designating that an uplink flow requests an admission control procedure with regard to a session by regarding a minimum quality of service (QoS) of the uplink flow as a specification quality of a downlink flow in the application specification type field of the standard DSA related message.

The revised DSA related message may further allocate an information area for indicating whether a strict service guarantee is requested with regard to a bidirectional flow in a request/transmission policy type of the standard DSA related message.

The revised DSA related message may further allocate an information area for indicating response information on whether to allow establishment of the bidirectional flow in a command and control type field of the standard DSA related message.

According to another aspect of the present invention, there is provided a method of supporting a bidirectional flow service between an SS and a BS according to a request of the SS, the method comprising: receiving from the SS a DSA-REQ message including information in which uplink and downlink sessions are established; and the BS examining whether the uplink and downlink sessions can be established as a QoS corresponding to the information in which the uplink and downlink sessions are established included in the DSA-REQ message, and performing an initialization process corresponding to a result of the examining.

The DSA-REQ message may comprise any one of information for designating whether uplink and downlink sessions are established, modified, or deleted in a standard application specification type field, information for designating that the uplink and downlink sessions have identical session characteristics, and information for designating that an uplink flow requests an admission control procedure with regard to a session by regarding a minimum QoS of the uplink flow as a specification quality of a downlink flow.

The revised DSA-REQ message may comprise information for indicating whether a strict service guarantee is requested with regard to a bidirectional flow in a standard request/transmission policy type field.

In the examining of whether the uplink and downlink sessions can be established, the BS may generate a DSA-RSP message corresponding to the result of the examining and transmitting the DSA-RSP message to the SS, wherein the DSA-RSP message comprises information for indicating response information on whether to allow establishment of the bidirectional flow in a standard command and control type field.

The method may further comprise: after receiving the DSA-REQ message, the BS that received the DSA-REQ message examining the integrity of the DSA-REQ message, generating a DSA-RVD message corresponding to the result of the examining, and transmitting the DSX-RVD to the SS.

The method may further comprise: after examining whether the uplink and downlink sessions can be established, receiving a DSA-ACK message indicating that session establishment negotiation is completed from the SS that received the DSA-RSP message during an initialization process.

The initialization process may comprise: determining a state of a first specific bit value allocated to designate the establishment of the uplink and downlink session in an application specification type field included in the received DSA-REQ message; and if the state of the first specific bit value is a value requesting the establishment of the uplink and downlink sessions, performing a bidirectional flow initialization so as to establish a bidirectional session.

The method may further comprise: after performing the bidirectional flow initialization, determining a state of a second specific bit value allocated to designate whether a strict service guarantee is requested with regard to the bidirectional flow in the standard request/transmission policy type field included in the received DSA-REQ message; and if the state of the second specific bit value is a state for designating that the strict service guarantee is requested with regard to the bidirectional flow, examining whether to provide the strict service guarantee with regard to the bidirectional flow, generating response information corresponding to a result of the examining, and if the state of the second specific bit value is not a state for designating that the strict service guarantee is requested with regard to the bidirectional flow, determining whether a loose service guarantee is provided with the bidirectional flow, and generating response information corresponding to the determination result.

The response information may comprise information for indicating whether to allow the establishment of the bidirectional flow in a standard command and control type field included in the DSA-RSP message.

The information for indicating whether to allow the establishment of the bidirectional flow in the standard command and control type field included in the DSA-RSP message may comprise any one of information indicating that the establishment of the bidirectional flow is allowed, information indicating that establishment of a requested one-way flow is allowed, information indicating that the establishment of the bidirectional flow fails, and information indicating that the establishment of the requested one-way flow fails.

According to another aspect of the present invention, there is provided a method of supporting a bidirectional flow service between an SS and a BS according to a request of the BS, the method comprising; the SS receiving a DSA-REQ message including information in which uplink and downlink sessions are established from the BS; and the SS that received the DSA-REQ message examining whether the uplink and downlink sessions can be established as a QoS corresponding to the information in which the uplink and downlink sessions are established included in the DSA-REQ message, and performing an initialization process corresponding to a result of the examining.

The performing of the initialization process may comprise: determining a state of a first specific bit value allocated to designate establishment of the uplink and downlink session in an application specification type field included in the received DSA-REQ message and a state of a second specific bit value allocated to designate whether a strict service guarantee is requested with regard to the bidirectional flow in a standard request/transmission policy type field included in the received DSA-REQ message; and if the state of the first specific bit value is a value requesting the establishment of the uplink and downlink sessions and if the state of the second specific bit value is a state for designating that the strict service guarantee is requested with regard to the bidirectional flow, performing the initialization so as to establish a strict bidirectional flow, and, if the state of the first specific bit value is the value requesting the establishment of the uplink and downlink sessions and if the state of the second specific bit value is not the state for designating that the strict service guarantee is requested with regard to the bidirectional flow, performing the initialization so as to establish a loose bidirectional flow.

According to another aspect of the present invention, there is provided a computer readable recording medium having recorded thereon a program for executing the method of providing a flow service in an IEEE 802.16/WiBro.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Figure 1:
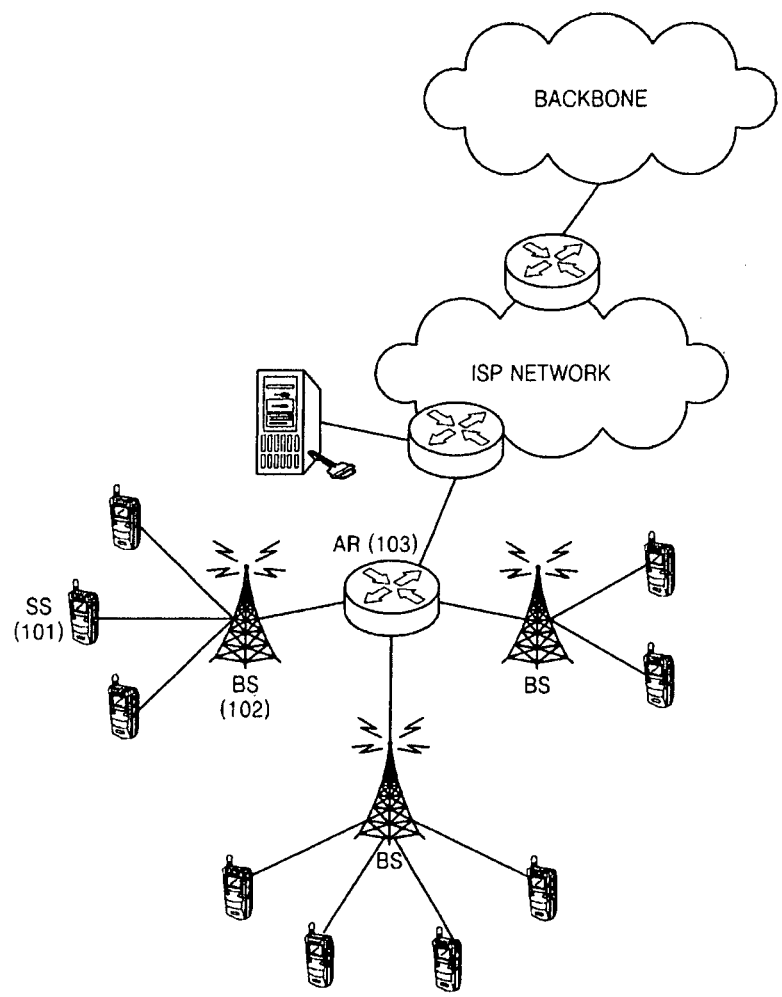
FIG. 1 illustrates the structure of an IEEE 802.16/WiBro network to which the present invention is applied.

FIG. 1 illustrates the structure of an IEEE 802.16/WiBro network to which the present invention is applied. Referring to FIG. 1, the IEEE 802.16/WiBro network comprises a subscriber station (SS) 101 that is a user terminal supporting an IEEE 802.16 protocol, a base station (BS) 102 that controls and manages a connection with the SS 101, and an access router (AR) 103 that transmits traffic received through the BS 102 to an Internet backbone network.

The IEEE 802.16/WiBro network basically provides a variety of quality of services (QoSs). A variety of QoS parameters, such as bandwidth, change according to services provided by an application layer of the SS 101. In the IEEE 802.16/WiBro network, the characteristics of a physical medium, such as a data transmission rate, may rapidly change according to the characteristics and environment of a wireless medium, unlike in a wired network.

Figure 2:
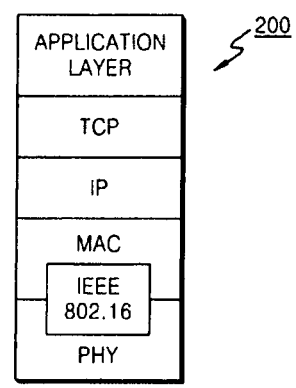
FIG. 2 is a diagram of a subscriber station (SS) layer according to an embodiment of the present invention.

FIG. 2 is a diagram of a subscriber station (SS) layer 200 according to an embodiment of the present invention. Referring to FIG. 2, the SS layer 200 includes a physical layer PHY and a medium access control (MAC) layer relating to the IEEE 802.16 protocol. An IP layer, a TCP layer, and application layer are sequentially disposed above the PHY layer and the MAC layer.

In the layer structure, a user can operate the application layer even though the user does not access a lower layer structure. The present invention provides a method of performing a bidirectional initialization process between a user terminal and a BS via a control message based on a dynamic service addition (DSA)-related message by amending the MAC layer, as described below.

A bidirectional flow establishment initialization process according to a general flow management method in an IEEE 802.16/WiBro network relating to the present invention will be described with reference to FIGS. 3A and 3B.

Figure 3A:
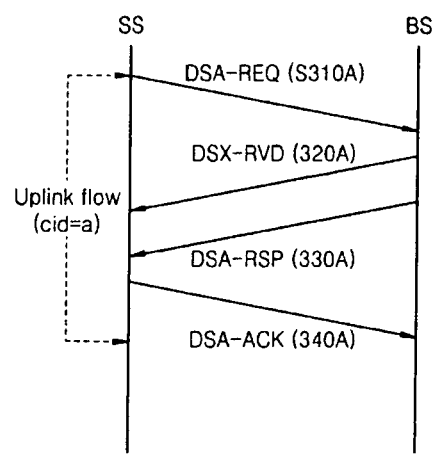
FIGS. 3A and 3B are flowcharts illustrating a bidirectional flow establishment initialization process according to a general flow management method in an IEEE 802.16/WiBro network relating to the present invention.

FIG. 3A is a flowchart illustrating a general uplink flow establishment process in the IEEE 802.16/WiBro network. FIG. 3B is a flowchart illustrating a general downlink flow establishment process in the IEEE 802.16/WiBro network.

Referring to FIG. 3A, if an SS transmits a DSA-REQ message requesting link flow establishment to the BS (operation 310A), the BS examines the integrity of the DSA-REQ message, generates a DSX-RVD message corresponding to the examination result, and transmits the DSX-RVD message to the SS (operation 320A). The BS processes an establishment of an uplink session according to the DSA-REQ message, generates a DSA-RSP message corresponding to the processing result, and transmits the DSA-RSP message to the SS (operation 330A).

The SS that receives the DSA-RSP message generates a DSA-ACK message indicating that uplink flow establishment negotiation is finished and transmits the DSA-ACK to the BS so that the uplink flow is successfully established (operation 340A).

Figure 3B:
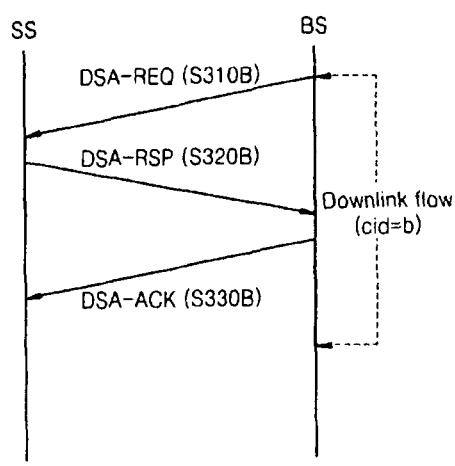

Referring to FIG. 3B, if the BS transmits a DSA-REQ message requesting link flow establishment to the SS (operation 310B), the SS processes the request for establishment of a downlink session according to the DSA-REQ message, generates a DSA-RSP message corresponding to the examination result, and transmits the DSA-RSP message to the BS (operation 320B).

The BS that receives the DSA-RSP message generates a DSA-ACK message indicating that a downlink flow establishment negotiation is finished and transmits the DSA-ACK to the SS so that the downlink flow is successfully established (operation 330B).

The processes shown in FIGS. 3A and 3B are separately performed in order to perform the bidirectional flow establishment initialization process according to the general flow management method in the IEEE 802.16/WiBro network relating to the present invention.

A total time $T_{init}$ used to perform the bidirectional flow establishment initialization process according to the general flow management method shown in FIGS. 3A and 3B is described below.

$T_1$ is the time it takes to establish the uplink flow (SS→BS) and is expressed according to equation 1 below, $$T_1 = \tau \cdot k \cdot p \Pi_{q=1}^{k-1}(1-p) \quad (1)$$

wherein, p denotes a probability of transmitting a contention message, q denotes a probability of communicating the contention result when a bidirectional session request is all accepted, and τ denotes a section length of a frame.

$T_2$ is the time it takes to establish the downlink flow (BS→SS) and is expressed according to equation 2 below, $$T_2 = \tau \cdot \epsilon \quad (2)$$

wherein τ denotes a section length of a frame, and ε denotes a frame used to respond to a received request message.

Therefore, the total time $T_{init}$ used to perform the bidirectional flow establishment initialization process according to the general flow management method is expressed according to equation 3 below, $$T_{init} \approx 2 \cdot \{2 \cdot T_1 + 2 \cdot T_2\} = 4\{\tau \cdot k \cdot p \Pi_{q=1}^{k-1}(1-p)\} + 4\{\tau \cdot \epsilon\} \quad (3)$$

The embodiment of the present invention will now be described with reference to the accompanying drawings.

With regard to the bidirectional flow service of the present invention, a modification of three fields of an IEEE 802.16/WiBro standard DSA related message is provided below.

First, an area used to determine whether both uplink and downlink sessions are established, modified, or deleted is allocated in an application specification type field of the standard DSA relating message.

In more detail, some bits indicating an application specification type are used to determine whether both uplink and downlink sessions are established, modified, or deleted according to Table 1 below.

TABLE 1

| Type | Length | Value | Scope |
|------|--------|-------|-------|
| [145/146].10 Application Specification | 1 | Bit #0: Bi-directional<br>Bit #1: The opposite directional service flow has same quality of specification<br>Bit #2: The opposite directional service flow has minimum quality of specification | DSA-REQ<br>DSA-RSP<br>DSC-REQ<br>DSC-RSP<br>DSD-REQ<br>DSD-RSP |

In Table 1, Bit #0, Bit #1, and Bit #2 designate an application specification as described below.

Bit #0: when the application specification field has a bit "1", both uplink and downlink sessions are established, modified, or deleted.

Bit #1: when the application specification field has a bit "1", both uplink and downlink have identical session characteristics.

Bit #2: when the application specification field has a bit "1", a quality of specification of a downlink flow is a minimum QoS of an uplink flow and thus a session admission control procedure is requested.

Second, an area, for indicating whether a strict service guarantee for a bidirectional flow is requested, is modified so as to be allocated to a request/transmission policy type field of the standard DSA related message.

In more detail, some bits, for indicating the request/transmission policy, are modified so as to be used to designate whether the strict service guarantee is requested with regard to the bidirectional flow according to Table 2 below.

TABLE 2

| Type | Length | Value | Scope |
|------|--------|-------|-------|
| [145/146].12 Request/transmission policy | 1 | Bit #7: Service flow shall be supported for both links (uplink & downlink) based on the required QoS (set 1) | DSA-REQ<br>DSA-RSP<br>DSA-ACK |

In Table 2, Bit #7 is used to combine a bit used in a given reserved field and bits of the application specification field indicated in Table 1 above.

If Bit #0 of the application specification field is "1" and Bit #7 of the request/transmission policy type field is "1", it means that the strict service guarantee is requested with regard to the bidirectional flow. In more detail, even when the condition of a service flow in a direction requested when both the uplink and downlink does not generate a session satisfying a quality of service (QoS) is satisfied, the request for generation of the session is rejected.

If Bit #0 of the application specification field is "1" and Bit #7 of the request/transmission policy type field is "0", it means that the loose service guarantee is requested with regard to the bidirectional flow. In more detail, even when the condition of a service flow in a direction requested when both the uplink and downlink does not generate a session satisfying a quality of service (QoS) is satisfied, the request for generation of the session is admitted.

Third, an area, for indicating response information on whether to allow establishment of the bidirectional flow, is modified so as to be allocated to a command and control type field of the standard DSA related message.

TABLE 3

| Type | Value | Scope |
|---|---|---|
| CC | 18: OK-acceptance-only-requested-direction | DSA-RSP |
|  | 19: reject-not-acceptable-both-direction | DSC-RSP |
|  | 20: reject-only-acceptance-requested-direction | DSD-RSP |

In Table 3, CC=18 indicates that a requested one-way flow establishment request is only allowed, CC=19 indicates that bidirectional flow establishment is rejected, and CC=20 indicates that the requested one-way flow establishment request is only rejected.

CC=0 indicates that the bidirectional flow establishment is allowed.

A bidirectional flow establishment process via a single control message by using the DSA related message of the present invention supporting a modification of the above three field types will now be described.

Figure 4:
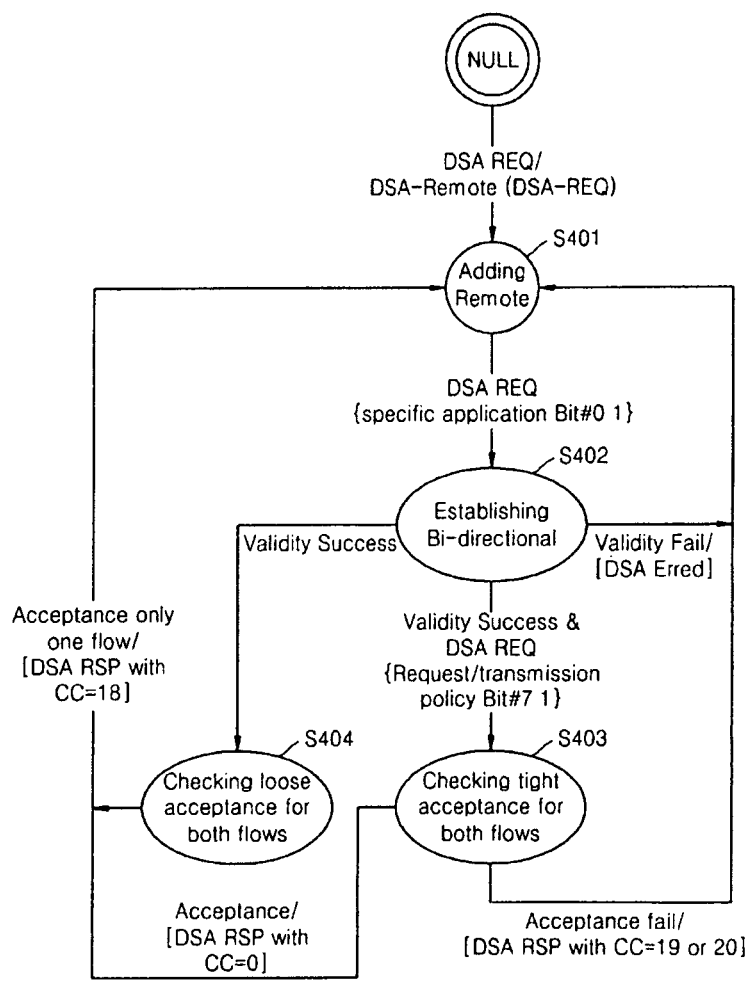
FIG. 4 is a state transition diagram of a dynamic service flow in view of a base station (BS) for explaining a bidirectional flow service support method in the IEE 802.16/WiBro system according to an embodiment of the present invention.

FIG. 4 is a state transition diagram of a dynamic service flow in view of a BS for explaining the bidirectional flow service support method in the IEE 802.16/WiBro system according to an embodiment of the present invention. Referring to FIG. 4, if a DSA-REQ message is received by the BS from an SS (operation 401), the BS examines Bit #0 in an application specification type included in the DSA-REQ message, and, if Bit #0 is "1", the BS performs a bidirectional flow establishment initialization (operation 402).

When Bit #0 in the application specification type included in the DSA-REQ message and Bit #7 in the request/transmission policy type field are set as "1", the BS examines whether a requested strict service can be guaranteed with respect to the bidirectional flow, generates a DSA-RSP message including response information CC on whether to allow the establishment of the bidirectional flow, and transmits the DSA-RSP message to the SS (operation 403). If the requested strict service cannot be guaranteed with respect to the bidirectional flow, the BS generates a DSA-RSP message including CC=19. If the requested strict service cannot be guaranteed with respect to an uplink flow but can be guaranteed with respect to a downlink flow, the BS generates a DSA-RSP message including CC=20. If the requested strict service can be guaranteed with respect to the uplink flow, the BS generates the DSA-RSP message including C=18. If the requested strict service can be guaranteed with respect to the bidirectional flow, the BS generates a DSA-RSP message including CC=0.

When Bit #0 in the application specification type included in the DSA-REQ message is set as "1" and Bit #7 in the request/transmission policy type field is set as "0", the BS examines whether a loose service can be guaranteed with respect to the bidirectional flow, generates a DSA-RSP message including response information CC on whether to allow the establishment of the bidirectional flow, and transmits the DSA-RSP message to the SS (operation 404). If the loose service can be guaranteed with respect to the bidirectional flow, the BS generates a DSA-RSP message including CC=0. If the loose service can be guaranteed with respect to the uplink flow, the BS generates the DSA-RSP message including C=18. If the loose service cannot be guaranteed with respect to the uplink flow but can be guaranteed with respect to the downlink flow, the BS generates a DSA-RSP message including CC=20.

Figure 5:
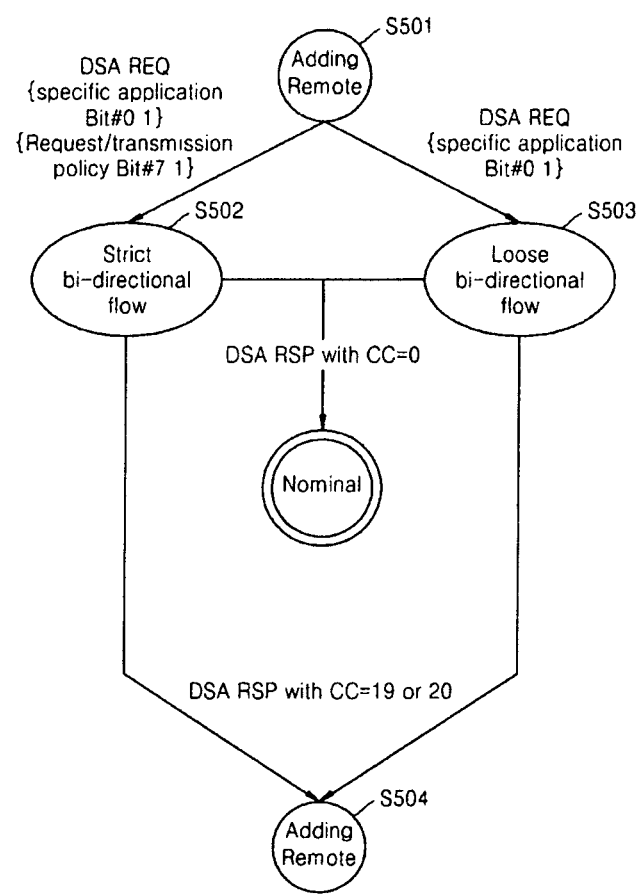
FIG. 5 is a state transition diagram of a dynamic service flow in view of an SS for explaining the bidirectional flow service support method in the IEE 802.16/WiBro system according to an embodiment of the present invention.

FIG. 5 is a state transition diagram of a dynamic service flow in view of an SS for explaining the bidirectional flow service support method in the IEE 802.16/WiBro system according to an embodiment of the present invention. Referring to FIG. 5, an SS transmits a DSA-REQ message, in which Bit #0 in the application specification type field and Bit #7 in the request/transmission policy type field are set as "1", to the BS (operation 501). If the SS receives a DSA-RSP message including CC=0 from the BS, uplink and downlink sessions that are guaranteed by a strict service are successfully established (operation 502).

The SS transmits a DSA-REQ message in which Bit #0 in the application specification type is set as "1" and Bit #7 in the request/transmission policy type field is set as "0" to the BS (operation 501). If the SS receives the DSA-RSP message including CC=0 from the BS, uplink and downlink sessions that are guaranteed by a loose service are successfully established (operation 503).

However, if the SS transmits the DSA-REQ message requesting a bidirectional service to the BS and receives the DSA-RSP message including CC=19 or CC=20 from the BS, the SS changes a service guarantee quality, generates DSA-REQ information requesting establishment of the bidirectional flow, and transmits the DSA-REQ information to the BS (operation 504).

Next, a bidirectional flow initialization process in the IEEE 802.16/WiBro system according to the present invention will now be described.

Figure 6:
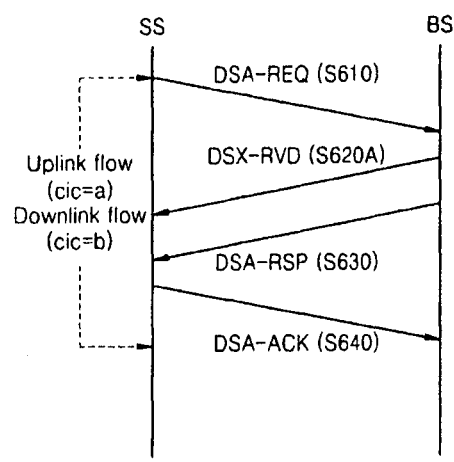
FIG. 6 is a flowchart illustrating a process of supporting a bidirectional flow service between an SS and BS according to a request of the SS in the bidirectional flow service supporting method in the IEEE 802.16/WiBro system according to an embodiment of the present invention.

A process of supporting a bidirectional flow service between the SS and BS according to a request of the SS in the bidirectional flow service supporting method in the IEEE 802.16/WiBro system according to an embodiment of the present invention will now be described with reference to FIG. 6.

The SS generates a DSA-REQ message including information indicating the establishment of both uplink and downlink sessions and transmits the DSA-REQ message to the BS (operation 610). In more detail, the SS sets Bit #0 in the application specification field included in the DSA-REQ message as "1" in order to request the establishment of the bidirectional flow. The SS sets Bit #7 of the request/transmission policy type field as "1" in order to request a strict service guarantee with regard to bidirectional flow, and sets it as "0" in order not to request the strict service guarantee.

The BS that receives the DSA-REQ message examines the integrity of the DSA-REQ message, generates a DSX-RVD message corresponding to the examination result, and transmits the DSX-RVD message to the SS (operation 620).

The BS examines if the uplink session and downlink session included in the received DSA-REQ message can be established having a QoS corresponding to information relating to the establishment request, generates a DSA-RSP message corresponding to the examination result, and transmits the DSA-RSP message to the SS (operation 630).

The SS that receives the DSA-RSP message transmits a DSA-ACK message acknowledging the receipt of the DSA-RSP message to the BS (operation 640).

If the SS receives from the BS a DSA-RSP message including CC=0 indicating that the establishment of the uplink and downlink sessions according to the requested specification is allowed, it is possible to successfully initialize the bidirectional flow between the SS and the BS via a single DSA-REQ message.

A process of supporting a bidirectional flow service between an SS and BS according to a request of the BS in the bidirectional flow service supporting method in the IEEE 802.16/WiBro system according to another embodiment of the present invention will now be described with reference to FIG. 7.

Figure 7:
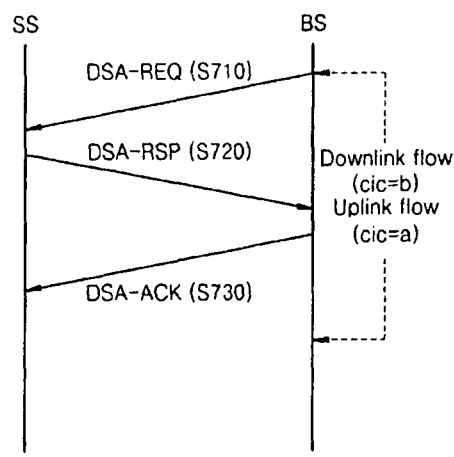
FIG. 7 is a flowchart illustrating a process of supporting a bidirectional flow service between an SS and a BS according to a request of the BS in the bidirectional flow service supporting method in the IEEE 802.16/WiBro system according to another embodiment of the present invention.

Referring to FIG. 7, the BS generates a DSA-REQ message including information indicating the establishment of both uplink and downlink sessions and transmits the DSA-REQ message to the SS (operation 710). In more detail, the BS sets Bit #0 in the application specification field included in the DSA-REQ message as "1" in order to request the establishment of the bidirectional flow. The BS sets Bit #7 of the request/transmission policy type field as "1" in order to request a strict service guarantee with regard to bidirectional flow, and sets it as "0" in order not to request the strict service guarantee.

The SS that receives the DSA-REQ message examines if the uplink session and downlink session included in the received DSA-REQ message can be established having a QoS corresponding to information relating to the establishment request, generates a DSA-RSP message corresponding to the examination result, and transmits the DSA-RSP message to the BS (operation 720).

The BS that receives the DSA-RSP message transmits a DSA-ACK message acknowledging the receipt of the DSA-RSP message to the SS (operation 730).

If the BS receives from the SS a DSA-RSP message including CC=0 indicating that the establishment of the uplink and downlink sessions according to the requested specification is allowed, it is possible to successfully initialize the bidirectional flow between the SS and the BS via a single DSA-REQ message.

A total time $T_{init}$ used to initialize the bidirectional flow when the bidirectional flow is initialized via a revised DSA related message according to the present embodiment is expressed according to equation 4 below, $$T_{init} \approx \{2 \cdot T_1 + 2 \cdot T_2\} = 2\{\tau \cdot k \cdot p \Pi_{q=1}^{k-1}(1-p)\} + 2\{\tau \cdot \epsilon\} \quad (4)$$

wherein, $T_1$ denotes the time taken to establish the uplink flow (SS→BS) which is given by equation 1, and $T_2$ denotes the time taken to establish the downlink flow (BS→SS) which is given by equation 2.

Therefore, the total time $T_{init}$ that it takes to initialize the bidirectional flow can be reduced by over ½ compared to the total time (see equation 3) taken to initialize the bidirectional flow according to a method of separately establishing the uplink flow and the downlink flow.

A bandwidth waste rate $BW_{waste}$ according to the method of separately establishing the uplink flow and the downlink flow is expressed according to equation 5 below.

$$BW_{waste} = \frac{\sum_{i=1}^{n}(1-q_i)(UL_i + DL_i)}{\sum_{i=1}^{n}(UL_i + DL_i)} \quad (5)$$

Meanwhile, the bandwidth waste rate $BW_{waste}$ of the session initialization process according to the method of initializing the bidirectional flow of the present embodiment is "0".

Although a bidirectional session establishment process is described in the above embodiments of the present invention for descriptive convenience, a DSC-related message can be used to change bidirectional sessions or a DSD-related message can be used to delete the bidirectional sessions.

As described above, a revised DSA related message is used to initialize the bidirectional flow via a single control message, which results in the effects described below.

First, it is possible to provide an accurate admission control service of an application having the characteristics of the one-way flow, if an omni-directional flow service is meaningless, the one-way flow service is rejected in order to serve another flow, thereby providing a more accurate admission control.

Second, single control message negotiation makes it possible to generate/modify/remove a service flow by an uplink and downlink pair, thereby reducing a temporal overhead caused during flow negotiation.

Third, single control message negotiation makes it possible to generate/modify/remove a service flow by an uplink and downlink pair, thereby reducing a spatial overhead caused during flow negotiation.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of providing a service flow in a network supporting an 802.16/WiBro, the method comprising:
generating a revised dynamic service addition (DSA) message in which bits for designating bidirectional flow management information are allocated from a standard DSA message;
performing a bidirectional service flow initialization process between a subscriber station (SS) and a base station (BS) via single control message negotiation based on the revised DSA related message;
determining a state of a first specific bit value allocated to designate establishment of an uplink and downlink session in an application specification type field included in a received DSA-REQ message and a state of a second specific bit value allocated to designate whether a strict service guarantee is requested with regard to the bidirectional flow in a standard request/transmission policy type field included in the received DSA-REQ message; and if the state of the first specific bit value is a value requesting the establishment of the uplink and downlink sessions and if the state of the second specific bit value is a state for designating that the strict service guarantee is requested with regard to the bidirectional flow, performing the initialization so as to establish a strict bidirectional flow, and, if the state of the first specific bit value is the value requesting the establishment of the uplink and downlink sessions and if the state of the second specific bit value is not the state for designating that the strict service guarantee is requested with regard to the bidirectional flow, performing the initialization so as to establish a loose bidirectional flow.

2. The method of claim 1, wherein the revised DSA related message further allocates an information area for designating whether uplink and downlink sessions are established, modified, or deleted in an application specification type field of the standard DSA related message, wherein the revised DSA related message further allocates the information area for designating that uplink and downlink sessions have identical session characteristics in the application specification type field of the standard DSA related message, and wherein the revised DSA related message further allocates the information area for designating that an uplink flow requests an admission control procedure with regard to a session by regarding a minimum quality of service (QoS) of the uplink flow as a specification quality of a downlink flow in the application specification type filed of the standard DSA related message.

3. The method of claim 1, wherein the revised DSA related message further allocates an information area for indicating whether a strict service guarantee is requested with regard to a bidirectional flow in a request/transmission policy type of the standard DSA related message; and wherein the revised DSA related message further allocates the information area for indicating response information on whether to allow establishment of the bi-directional flow in a command and control type field of the standard DSA related message.

4. A method of supporting a bidirectional service flow between a subscriber station (SS) and a base station (BS) according to a request of the SS in a network supporting an 802.16/WiBro, the method comprising;

receiving from the SS a dynamic service addition request (DSA-REQ) message revised to include information establishing uplink and downlink sessions; and the BS examining whether the uplink and downlink sessions can be established as a QoS corresponding to the information in which the uplink and downlink sessions are established included in the revised DSA-REQ message, and performing an initialization process corresponding to a result of the examining;

determining a state of a first specific bit value allocated to designate establishment of the uplink and downlink session in an application specification type field included in the received DSA-REQ message and a state of a second specific bit value allocated to designate whether a strict service guarantee is requested with regard to the bidirectional flow in a standard request/transmission policy type field included in received DSA-REQ message; and if the state of the first specific bit value is a value requesting the establishment of the uplink and downlink sessions and if the state of the second specific bit value is a state for designating that the strict service guarantee is requested with regard to the bidirectional flow, performing the initialization so as to establish a strict bidirectional flow, and, if state of the first specific bit value is the value requesting the establishment of the uplink and downlink sessions and if the state of the second specific bit value is not the state for designating that the strict service guarantee is requested with regard to the bidirectional flow, performing the initialization so as to establish a loose bidirectional flow.

5. The method of claim 4, wherein the DSA-REQ message comprises any one of information for designating whether uplink and downlink sessions are established, modified, or deleted in a standard application specification type field, information for designating that the uplink and downlink sessions have identical session characteristics, and information for designating that an uplink flow requests an admission control procedure with regard to a session by regarding a minimum QoS of the uplink flow as a specification quality of a downlink flow.

6. The method of claim 4, wherein the revised DSA-REQ message comprises information for indicating whether a strict service guarantee is requested with regard to a bidirectional flow in a standard request/transmission policy type field.

7. The method of claim 4, wherein the initialization process comprises;

determining a state of a first specific bit value allocated to designate the establishment of the uplink and downlink session in an application specification type field included in the received DSA-REQ message; and if the state of the first specific bit value is a value requesting the establishment of the uplink and downlink sessions, performing a bidirectional flow initialization so as to establish a bidirectional session.

8. The method of claim 7, further comprising: after performing the bidirectional flow initialization, determining a state of a second specific bit value allocated to designate whether a strict service guarantee is requested with regard to the bidirectional flow in the standard request/transmission policy type field included in the received DSA-REQ message; and if the state of the second specific bit value is a state for designating that the strict service guarantee is requested with regard to the bidirectional flow, examining whether to provide the strict service guarantee with regard to the bidirectional flow, generating response information corresponding to a result of the examining, and if the state of the second specific bit value is not a state for designating that the strict service guarantee is requested with regard to the bidirectional flow, determining whether a loose service guarantee is provided with the bidirectional flow, and generating response information corresponding to the determination result.

9. The method of claim 8, wherein the response information comprises information for indicating whether to allow the establishment of the bidirectional flow in a standard command and control type field included in the DSA-RSP message.

10. A method of supporting a bidirectional service flow between a subscriber station (SS) and a base station (BS) according to a request of the BS in a network supporting an 802.16/WiBro, the method comprising;

the SS receiving a dynamic service addition request (DSA-REQ) message revised to include information in which uplink and downlink sessions are established from the BS; and the SS that received the revised DSA-REQ message examining whether the uplink and downlink sessions can be established as a quality of service (QoS) corresponding to the information in which the uplink and downlink sessions are established included in the revised DSA-REQ message, and performing an initialization process corresponding to a result of the examining;

determining a state of a first specific bit value allocated to designate establishment of the uplink and downlink session in an application specification type field included in the received DSA-REQ message and a state of a second specific bit value allocated to designate whether a strict service guarantee is requested with regard to the bidirectional flow in a standard request/transmission policy type field included in the received DSA-REQ message; and if the state of the first specific bit value is a value requesting the establishment of the uplink and downlink sessions and if the state of the second specific bit value is a state for designating that the strict service guarantee is requested with regard to the bidirectional flow, performing the initialization so as to establish a strict bidirectional flow, and, if the state of the first specific bit value is the value requesting the establishment of the uplink and downlink sessions and if the state of the second specific bit value is not the state for designating that the strict service guarantee is requested with regard to the bidirectional flow, performing the initialization so as to establish a loose bidirectional flow.

11. A non-transitory computer readable recording medium having recorded thereon a program for executing the method of claim 1.

* * * * *